(12) United States Patent
Song et al.

(10) Patent No.: US 8,812,577 B2
(45) Date of Patent: Aug. 19, 2014

(54) MOBILE MIDDLEWARE SUPPORTING CONTEXT MONITORING AND CONTEXT MONITORING METHOD USING THE SAME

(75) Inventors: June-Hwa Song, Yuseong-gu (KR);
Seung-Woo Kang, Yuseong-gu (KR);
Yong-Joon Son, Yuseong-gu (KR);
Hyuk-Jae Jang, Yuseong-gu (KR);
Jin-Won Lee, Yuseong-gu (KR);
Soun-Eil Park, Yuseong-gu (KR);
Hyon-Ik Lee, Yuseong-gu (KR);
Tai-Woo Park, Yuseong-gu (KR)

(73) Assignee: Korea Advanced Institute of Science and Technology, Yuseong-gu, Daejeon (KR)

( * ) Notice: Subject to any disclaimer, the term of this patent is extended or adjusted under 35 U.S.C. 154(b) by 1475 days.

(21) Appl. No.: 12/055,915

(22) Filed: Mar. 26, 2008

(65) Prior Publication Data
US 2008/0248789 A1   Oct. 9, 2008

(30) Foreign Application Priority Data

Apr. 6, 2007   (KR) .................. 10-2007-0034023

(51) Int. Cl.
*G06F 15/16*   (2006.01)
(52) U.S. Cl.
USPC ............ 709/201; 709/202; 709/203; 709/224
(58) Field of Classification Search
USPC ................................ 709/201, 202, 203, 224
See application file for complete search history.

(56) References Cited

U.S. PATENT DOCUMENTS

2009/0063431 A1* 3/2009 Erol et al. .................... 707/3
2009/0222541 A1* 9/2009 Monga et al. ................. 709/222
2010/0007483 A1* 1/2010 Oh et al. ........................ 340/521
2010/0202061 A1* 8/2010 Black et al. ................... 359/653
2010/0205061 A1* 8/2010 Karmarkar ................. 705/14.64
2011/0014933 A1* 1/2011 Karmarkar et al. ........... 455/466
2011/0022349 A1* 1/2011 Stirling et al. ................ 702/141

FOREIGN PATENT DOCUMENTS

| KR | 10-2004-0071467 | 8/2004 |
| KR | 10-2006-0076839 | 7/2006 |
| KR | 10-2006-0127647 | 12/2006 |
| KR | 10-2007-0001319 | 1/2007 |

OTHER PUBLICATIONS

Dey, Anind K. et al. "The Context Toolkit: Aiding the Development of Context-Aware Applications." http://www.cc.gatech.edu/fee/contexttoolkit.

Chary, Ram et al. "Sensor-based Power Management for mobile devices" Proceedings of the 11th IEEE Symposium on Computers and Communications (2006).

(Continued)

*Primary Examiner* — Lan-Dai T Truong
(74) *Attorney, Agent, or Firm* — Merchant & Gould P.C.

(57) ABSTRACT

Disclosed herein is mobile middleware, a context monitoring method, a context-aware system, and a context-aware service provision method, which support energy-efficient context monitoring. The mobile middleware receives a request for a CMQ from context-aware application programs, receives sensor data from sensors, monitors whether the CMQ is satisfied, and transmits an event to the context-aware application programs according to results of the monitoring. In this case, the mobile middleware controls the sensors so that only sensor data required to determine whether the CMQ is satisfied needs to be transmitted so as to reduce energy consumption during the performance of the monitoring. Therefore, the mobile middleware can perform energy-efficient context monitoring, required by the context-aware application programs.

19 Claims, 11 Drawing Sheets

(56) References Cited

OTHER PUBLICATIONS

Jafari, Roozbeh et al. "Adaptive and Fault Tolerant Medical Vest for Life-Critical Medical Monitoring" 2005 ACM Symposium on Applied Computing.

Jafari, Roozbeh et al. "Adaptive Medical Feature Extraction for Resource Constrained Distributed Embedded Systems." Proceedings of the Fourth Annual IEE International Conference on Pervasive Computing and Communications Workshops (2006).

* cited by examiner

| CMQ TABLE | | |
|---|---|---|
| QUERY ID | QUERY RESULTS | QUERY ELEMENTS |
| Q1 | FALSE | [S1,(bo,b1),FALSE]<br>[S2,(b1,b2),TRUE] |
| Q2 | FALSE | [S1,(bo,b2),FALSE]<br>[S2,(b2,b3),FALSE] |
| Q3 | TRUE | [S1,(b1,b3),TRUE]<br>[S3,(b2,b4),TRUE] |
| ⋮ | ⋮ | ⋮ |

FIG. 8

| QUERY ID | CONDITION |
|---|---|
| A | (S10<25) ∧ (16<S11<30) |
| B | (15<S10<20) ∧ (S11<16) ∧ (S12<10) ∧ (60<S13) |
| C | (12<S11<24) ∧ (5<S12<10) ∧ (6<S14<9) |
| D | (10<S12<15) ∧ (40<S13<60) ∧ (50<S15<60) |
| E | (10<S12<20) ∧ (3<S14<9) ∧ (60<S15<80) |
| F | (15<S12<20) ∧ (70<S15<80) |
| G | (40<S13<60) ∧ (3<S14) ∧ (39<S16<52) |
| H | (3<S14<6) ∧ (S15<80) ∧ (S16<26) |
| I | (10<S12<20) ∧ (50<S13<60) ∧ (9<S14<18) |
| J | (20<S10) ∧ (40<S13<50) ∧ (S14<6) |

F-SOURCE COVER [S11,S12,S13,S14,S15,S16]
T-SOURCE COVER [S10,S11]

MINIMUM F-SOURCE COVER [S12,S13,S14]

REDUCED SOURCE COVER [S10,S11,S12,S14]

MOBILE MIDDLEWARE SUPPORTING CONTEXT MONITORING AND CONTEXT MONITORING METHOD USING THE SAME

BACKGROUND OF THE INVENTION

1. Field of the Invention

The present invention relates, in general, to mobile middleware, and, more particularly, to mobile middleware, a context monitoring method, a context-aware system, and a context-aware service provision method, which support energy-efficient context monitoring for context-aware application programs.

2. Description of the Related Art

A recent information communication paradigm that has arisen is ubiquitous computing, ubiquitous Networks, pervasive computing, etc. These terms indicate the same concept, wherein the term "ubiquitous" means that a user can easily obtain desired information anytime and anywhere. In the ubiquitous generation that will come in the future, smart objects, having a computing and communication ability, will have the characteristics of being aware of variation in dynamic environments and adapting themselves to such dynamic environmental variation, that is, context-aware characteristics.

A Personal Area Network (hereinafter referred to as a 'PAN') is core technology for realizing ubiquitous networks that will have context-aware characteristics. The term "PAN" refers to network technology that can be used within a short range around a person, and means technology for connecting various types of equipment to each other over a network by a distance of about 10 m from a person who uses the network. A person-centered PAN is suitable for context-aware applications, which provide suitable services depending on various types of context related to the behavior, physical conditions and environment of a user. In a PAN environment, a network is configured on the basis of a person, and thus a mobile device, which is portable, may be a core platform for receiving data from various sensors and providing user context information to the context-aware application programs. For example, it is possible to be aware of the context of a user through the collection and exchange of context information by a mobile communication terminal, and to provide information to context-aware application programs through processing, such as analysis and reasoning. The context-aware application programs can provide services suitable for the context of the user. In this case, mobile middleware capable of simultaneously and efficiently supporting a plurality of context-aware application programs is required.

However, conventional middleware supporting context-aware application programs merely provides a typical framework for a context-aware method, such as resource searching, data pre-processing, the generation and classification of feature values, and reasoning, but does not provide sufficient technology for supporting energy-efficient context monitoring. Further, data processing technology used in conventional middleware supports Structured Query Language (SQL)-based query models for data streams and database operations. This technology was developed to be applied in environments in which there are no restrictions on computing resources, like a high-performance server or a desk-top PC. That is, there is a problem in that the conventional middleware and data processing technology used therein are not suitable for the environment of mobile devices, in which limited energy is provided.

Therefore, energy-efficient mobile middleware capable of continuously monitoring data, provided by sensors, in the environment of mobile devices, on which serious resource limitations are imposed, is required.

SUMMARY OF THE INVENTION

Accordingly, the present invention has been made keeping in mind the above problems occurring in the prior art, and an object of the present invention is to provide mobile middleware, which can perform energy-efficient monitoring by stopping the operation of unnecessary sensors at the time of performing context monitoring, required by context-aware application programs, in a mobile device.

Another object of the present invention is to provide a context monitoring method, a context-aware system, and a context-aware service provision method, which support energy-efficient monitoring in a mobile device.

In accordance with an aspect of the present invention to accomplish the above objects, there is provided mobile middleware, comprising a Context Monitoring Query (CMQ) processor and a minimum context element set (Reduced Source Cover: RSC) manager.

The CMQ processor stores requested CMQs, receives sensor data from sensors, monitors whether the stored CMQs are satisfied, and transmits an event according to the results of the monitoring. The RSC manager controls the activation of the sensors so that, of the received sensor data, only the data of context elements, belonging to the RSC required to determine whether the CMQs are satisfied, is generated. The mobile middleware can be used in a Personal Area Network (PAN) environment.

Preferably, each of the CMQs may comprise a NOTIFY clause for specifying Identifications (IDs) of context-aware application programs that requested respective CMQs, a CONDITION clause for specifying at least one condition, including any one of the context elements, an operator, and a condition value, in a conjunctive normal form, and a DURATION clause for specifying a time for which the monitoring is maintained.

The CMQ processor may comprise a CMQ table for storing query IDs, which are required to identify the CMQs, query results, which indicate results of the CMQs, and query elements, which indicate conditions included in the CMQs, and a CMQ index for storing IDs of the context elements and current values of the context elements. Each of the query elements may comprise IDs of respective context elements, interval conditions, indicating ranges required by the context elements, and element results, indicating whether respective context elements satisfy the interval conditions. The CMQ index may comprise an RS list including Region Segment (RS) nodes, generated by dividing possible values of the context elements, into region segments according to the ranges required by the CMQs, and a source table having IDs of respective context elements, and pointers for pointing at RS nodes, including current values of the context elements.

The RSC manager may comprise an RSC calculator for calculating the RSC required to determine whether the CMQs are satisfied with reference to the results of the monitoring, and a sensor controller for stopping sensing and data transmission performed by sensors, which provide data about context elements that do not belong to the RSC, or for reducing a data transfer rate of the sensors. The RSC calculator may obtain a 'true' context element set, which is a set of all 'true' context elements, included in CMQs having results of 'true', among the CMQs, may obtain a 'false' context element set, which is a set of all 'false' context elements, included in CMQs having results of 'false', among the CMQs, may obtain a minimum 'false' context element set, for which each CMQ having a result of 'false' includes one or more 'false' context elements and in which a number of 'false context elements' is a minimum, among subsets of the 'false' context element set, obtains a union of the 'true' context element set and the minimum 'false' context element set, and may calculate the RSC without considering a first context element, when any one of CMQs, results of which become 'false' due to the first context element included in the minimum 'false' context element set in the union of the sets, can be determined to be 'false' due to a second context element included in the 'true' context element set. Preferably, the minimum 'false' context element set may be an approximate minimum 'false' context element set obtained using a greedy heuristic method.

Preferably, the mobile middleware may further comprise a data processor for receiving the sensor data from the sensors and transmitting the sensor data to the CMQ processor. The data processor may comprise a data collector for receiving the sensor data from the sensors and outputting the sensor data, and a feature generator for receiving the sensor data from the data collector, extracting feature values from the sensor data, and outputting the feature values.

Preferably, the RSC manager may comprise an RSC calculator for calculating the RSC, required to determine whether the CMQs are satisfied, with reference to the results of the monitoring, a sensor controller for stopping sensing and data transmission performed by sensors, which provide data about context elements that do not belong to the RSC, or for reducing a data transfer rate of the sensors, and a feature controller for controlling the feature generator so that a procedure for calculating feature values corresponding to context elements that do not belong to the RSC is obviated, thus reducing energy consumption caused by the procedure for calculating the feature values.

Preferably, the mobile middleware may further comprise a context broker for converting the requested CMQs into system-level CMQs and outputting the system-level CMQs to the CMQ processor.

In accordance with another aspect of the present invention to accomplish the above objects, there is provided a context monitoring method, comprising registering a requested CMQ, receiving sensor data from sensors and monitoring whether the registered CMQ is satisfied, controlling activation of the sensors so that, of the received data, data about context elements belonging to a Reduced Source Cover (RSC) required to determine whether the CMQ is satisfied, is generated, and providing an event according to the results of the monitoring. Preferably, the context monitoring method may be used in a PAN environment.

Preferably, the registering the CMQ may comprise converting the requested CMQ into a system-level CMQ, and storing the system-level CMQ. The controlling the activation of the sensors may comprise calculating the RSC, required to determine whether the registered CMQ is satisfied, with reference to the results of the monitoring, and stopping sensing and data transmission performed by sensors, which provide data about context elements that do not belong to the RSC.

Preferably, the monitoring whether the registered CMQ is satisfied may be performed to receive the sensor data and feature value, extracted from the sensor data, and to thus monitor whether the registered CMQ is satisfied, and the controlling the activation of the sensors may be performed to control activation of the sensors and generation of the feature values so that, of the received sensor data and the received feature values, data about only context elements belonging to the RSC required to determine whether the CMQ is satisfied, is generated.

In accordance with a further aspect of the present invention to accomplish the above objects, there is provided a context-aware service system, comprising at least one context-aware application program, at least one sensor, and mobile middleware.

The context-aware application program requests a Context Monitoring Query (CMQ) and receives an event when the CMQ is satisfied. The sensor senses user context information and generates sensor data. The mobile middleware receives a request for the CMQ from the context-aware application program, registers the CMQ, receives the sensor data from the sensor, monitors whether the CMQ is satisfied, provides an event according to results of the monitoring, and controls the sensor to reduce energy consumption caused by performance of the monitoring.

In accordance with yet another aspect of the present invention to accomplish the above objects, there is provided a context-aware service provision method, comprising at least one context-aware application program requesting a CMQ, registering the requested CMQ, receiving sensor data from at least one sensor, monitoring whether the registered CMQ is satisfied using the sensor data received from the sensor, calculating an RSC, required to determine whether the registered CMQ is satisfied during the performance of the monitoring, controlling the sensor according to results of calculation, providing an event to the context-aware application program according to results of the monitoring, and deleting the registered CMQ when a duration of the registered CMQ has elapsed.

Therefore, the mobile middleware, the context monitoring method, the context-aware system, and the context-aware service provision method according to embodiments of the present invention can perform energy-efficient context monitoring, and can stop the operation of unnecessary sensors when context monitoring is performed.

BRIEF DESCRIPTION OF THE DRAWINGS

The above and other objects, features and other advantages of the present invention will be more clearly understood from the following detailed description taken in conjunction with the accompanying drawings, in which:

FIGS. 5 and 6 are diagrams showing examples of a CMQ index and a CMQ table included in the CMQ processor of FIG. 4;

FIGS. 8, 9, 10 and 11 are diagrams showing an example of a procedure for obtaining an RSC using the conditions of CMQs and the values of context elements.

DESCRIPTION OF THE PREFERRED EMBODIMENTS

Figure 1:
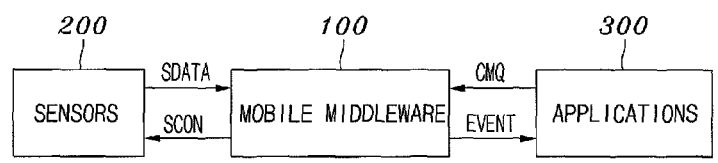
FIG. 1 is a block diagram showing a context-aware system according to an embodiment of the present invention.

In embodiments of the present invention disclosed in the text of the present invention, specific structural or functional descriptions are exemplified to merely describe the embodiments of the present invention, and the embodiments of the present invention can be implemented in various forms and should not be interpreted as being limited to the embodiments described in the text of the present invention.

The present invention can be variously modified and can have various forms, and specific embodiments are intended to be shown in the drawings and to be described in detail in the specification. However, this is not intended to limit the present invention to specific embodiments, and it should be understood that the present invention includes all modifications, equivalents or replacements included in the spirit and scope of the present invention.

Terms, such as "first" and "second," can be used to describe various components, but the components are not limited by the terms. The terms are merely used to distinguish one component from another component. For example, the first component can be designated as the second component without departing from the scope of the present invention, and, similarly, the second component can also be designated as the first component.

When it is stated that a specific component is "connected" or "coupled" to another component, it should be understood that the specific component, can be directly connected or linked, but other components may be interposed between the specific component and the other component. In contrast, when it is stated that a specific component is "directly connected" or "directly coupled" to another component, it should be understood that no other components are interposed between the specific component and the other component. Other expressions for describing the relationship between components, that is, "between ~", and "immediately between~", or "adjacent to ~", and "immediately adjacent to~", should be interpreted using the same method.

The terms used in the present specification are used only to describe specific embodiments, and are not intended to limit the present invention. Singular expressions may include the meaning of plural expressions as long as there is no definite difference therebetween in the context. In the present application, it should be understood that terms such as "include" or "have", are intended to indicate that proposed features, numbers, steps, operations, components, parts, or combinations thereof exist, and the probability of existence or addition of one or more other features, steps, operations, components, parts or combinations thereof is not excluded thereby.

As long as all of the terms used here, including technical or scientific terms, are not defined otherwise, the terms have the same meaning as terms generally understood by those skilled in the art. The terms, defined in generally used dictionaries, should be interpreted as having the same meaning as the terms in the context of related arts, and are not to be interpreted to have meanings that are ideal or are excessively formal, when the terms are not explicitly defined in the present specification.

Hereinafter, embodiments of the present invention will be described in detail with reference to the attached drawings. Reference now should be made to the drawings, in which the same reference numerals are used throughout the different drawings to designate the same or similar components, and repeated descriptions of the same components are omitted.

FIG. 1 is a block diagram showing a context-aware system according to an embodiment of the present invention.

Referring to FIG. 1, the context-aware system includes mobile middleware 100, sensors 200, and context-aware application programs 300.

The mobile middleware 100 receives a request for a Context Monitoring Query (CMQ) from the context-aware application programs 300, registers the CMQ, receives sensor data SDATA from the sensors 200, monitors whether the CMQ is satisfied, provides an event (EVENT) to the context-aware application programs 300 when the result of the CMQ changes from 'true' to 'false' or from 'false' to 'true', and applies a sensor control signal SCON, required to control the sensors 200, to the sensors 200 so as to reduce energy consumption occurring during the performance of the monitoring.

According to an embodiment, the sensors 200 may include a light sensor, a temperature sensor, an accelerometer, etc., and context elements sensed by respective sensors may include light, temperature, acceleration, etc. The sensor data SDATA measured by the sensors 200 is provided to the mobile middleware 100, and is utilized for monitoring. The operation of the sensors 200, which transmit sensor data SDATA, which is not required to determine whether the CMQ requested by the context-aware application programs 300 is satisfied, may be stopped in response to the sensor control signal SCON. Further, when previously unnecessary sensor data SDATA becomes necessary according to the results of the monitoring, the sensors 200, which are currently stopped, may be restarted in response to the sensor control signal SCON.

According to an embodiment, the context-aware application programs 300 may include a route guidance program, a medical information provision program, etc. Each of the context-aware application programs 300 requests a CMQ corresponding to the purpose of a program from the mobile middleware 100. The mobile middleware 100 registers the CMQ and monitors whether the CMQ is 'true' or 'false'. When the result of the CMQ changes, the mobile middleware 100 provides an event to the corresponding context-aware application program 300.

The operation of the context-aware system according to an embodiment of the present invention is described below. The context-aware application programs 300 request a CMQ from the mobile middleware 100. The mobile middleware 100 registers the requested CMQ, receives sensor data SDATA from the sensors 200, and then monitors whether the registered CMQ is satisfied. When the result of the CMQ changes from 'true' to 'false', or from 'false' to 'true' according to the results of the monitoring, the mobile middleware 100 provides an event to the context-aware application programs 300. Further, the mobile middleware 100 calculates a Reduced Source Cover (RSC), required for the registered CMQ during the performance of monitoring, and controls the sensors 200 so that only the sensors 200 for sensing data about context elements belonging to the RSC are operated. Meanwhile, the mobile middleware 100 can delete the registered CMQ when the duration of the registered CMQ has elapsed.

Figure 2:
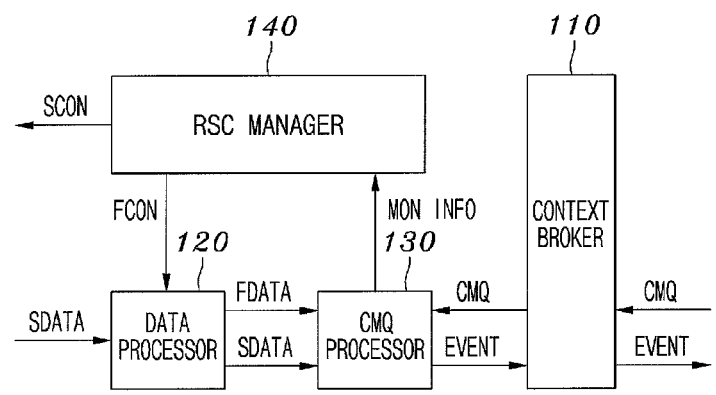
FIG. 2 is a block diagram showing mobile middleware according to an embodiment of the present invention.

FIG. 2 is a block diagram showing mobile middleware according to an embodiment of the present invention.

Referring to FIG. 2, the mobile middleware 100 includes a CMQ processor 130 and an RSC manager 140. According to an embodiment, the mobile middleware 100 may further include a context broker 110 and a data processor 120.

The context broker 110 receives requests for CMQs from the context-aware application programs 300 of FIG. 1. Meanwhile, each of the CMQs includes a NOTIFY clause for specifying the ID of the context-aware application program 300 of FIG. 1 that requested the CMQ, a CONDITION clause for specifying at least one condition, including a context element, an operator and a value, in a Conjunctive Normal Form (CNF), and a DURATION clause for specifying the time for which monitoring is maintained. An example sentence for the above CMQ is described in the following Table 1.

TABLE 1

NOTIFY: App-ID
CONDITION (9:00 p.m. < time < 11:00 p.m.) AND (location = playground) AND (noise=silent)
DURATION 28 days In the above Table 1, 'time', 'location' and 'noise', specified in the CONDITION clause, are context elements for representing the context of a user, and described content indicates that "When a context, in which little noise exists, occurs in a playground, which is the user's location, during the time from 9 p.m. to 11 p.m. within 28 days, please provide an event to 'App-ID'." That is, the CMQ requests that an event be provided to the context-aware application program 300 of FIG. 1 specified in the NOTIFY clause if the conditions of the context elements specified in the CONDITION clause are satisfied within the interval specified in the DURATION clause.

In this case, the CMQ, represented in an application level according to an embodiment, can be converted into a system-level CMQ, which is a system-level representation, so as to allow the CMQ processor 130 to process the CMQ. When the CMQ is converted into a system-level CMQ, the conditions of respective context elements are represented in numerical values. For example, a condition for 'noise', which is a context element, is '(noise=silent)'. When the condition for 'noise' is converted, it can be represented by '(45 dB<noise<55 dB)'. The rules of conversion into a system level can be defined by the programmer of the context-aware application programs 300, or can be automatically determined as a Geographic Information System (GIS), a Global Positioning System (GPS), etc. For example, the CMQ of Table 1 can be converted into the system-level CMQ of Table 2.

TABLE 2

NOTIFY: App-ID
CONDITION (9:00 p.m. < time < 11:00 p.m.) AND ((36°22' 04.28" < longitude < 36°22' 04.60") AND (127°21' 56.60" < latitude < 127°21' 56.90")) AND (noise <50dB)
DURATION 28 days In table 2, the conditions for location and noise, which are context elements, are converted.

The context broker 110 converts the CMQs, requested by the context-aware application programs 300 of FIG. 1, into system-level CMQs that can be processed by the CMQ processor 130, and applies the system-level CMQs to the CMQ processor 130. The CMQ processor 130, having received the system-level CMQs, generates an event (EVENT) when the CMQs are satisfied, and applies the event to the context broker 110. When the event is received, the context broker 110 transmits the event to the context-aware application programs 300 of FIG. 1 that requested the CMQs. According to one embodiment, the context broker 110 may be eliminated, and the CMQ processor 130 may directly receive requests for CMQs from the context-aware application programs 300 of FIG. 1 and directly transmit an event to the context-aware application programs 300.

The data processor 120 receives the sensor data SDATA from the sensors 200 of FIG. 1, extracts feature values (FDATA) from the sensor data SDATA, and provides the sensor data SDATA and/or the feature values FDATA to the CMQ processor 130 as the input thereof. When the feature values FDATA are not required in order to determine whether CMQs are satisfied, the RSC manager 140 applies a feature control signal FCON to the data processor 120. The data processor 120, having received the feature control signal FCON, stops the extraction of unnecessary feature values FDATA. According to an embodiment, the data processor 120 may be obviated, and the CMQ processor 130 of FIG. 1 may directly receive the sensor data SDATA from the sensors 200 of FIG. 1.

The CMQ processor 130 stores CMQs, received from the context broker 110, and monitors whether the results of the CMQs are 'true' with reference to the sensor data SDATA and/or the feature values FDATA, which are received from the data processor 120. According to the results of monitoring, when the results of the CMQs change from 'true' to 'false', or from 'false' to 'true', the CMQ processor 130 transmits an event (EVENT) to the context-aware application programs that requested the changing CMQs, through the context broker 110. The CMQ processor 130 provides monitoring context information (MON INFO), which indicates both current monitoring results and information about the CMQs, to the RSC manager 140 so as to extract sensor data SDATA and/or feature values FDATA required to determine whether CMQs are satisfied. According to one embodiment, the CMQ processor 130 can directly receive the CMQs from the context-aware application programs 300 of FIG. 1, store the CMQs, monitor whether the results of the CMQs have changed, and directly transmit an event to the context-aware application programs 300 of FIG. 1. Further, according to another embodiment, the CMQ processor 130 can directly receive sensor data SDATA from the sensors 200 of FIG. 1.

The RSC manager 140 receives the monitoring context information MON INFO from the CMQ processor 130 and classifies the sensor data and/or the feature values into sensor data SDATA and/or feature values FDATA, which are required to determine whether CMQs are satisfied, and sensor data SDATA and/or feature values FDATA, which are not required to determine whether CMQs are satisfied. The sensor data SDATA and/or feature values FDATA, which are required to determine whether CMQs are satisfied, are sensor data SDATA and/or feature values FDATA that cause the result of the CMQs to change from 'true' to 'false' or from 'false' to 'true' in response to the sensor data SDATA and/or the feature values FDATA, and indicate data about context elements belonging to the RSC. When the sensor data SDATA becomes unnecessary, it is possible to apply the sensor control signal SCON to the sensors for transmitting the sensor data SDATA, thus preventing the sensors from being operated. Further, when the feature values FDATA become unnecessary, it is possible to apply the feature control signal FCON to the data processor 120, thus stopping the extraction of the feature values FDATA. Energy consumption occurring in the sensors and the middleware can be reduced due to the stoppage of the operation of sensors, the transmission of the sensor data SDATA, the extraction of feature values FDATA, etc. In particular, the context monitoring method of controlling sensors may be very efficient for sensors and mobile devices that use batteries having limited capacities. Further, the content monitoring method of controlling sensors may be efficient in a PAN environment, in which mobile devices are used.

Figure 3:
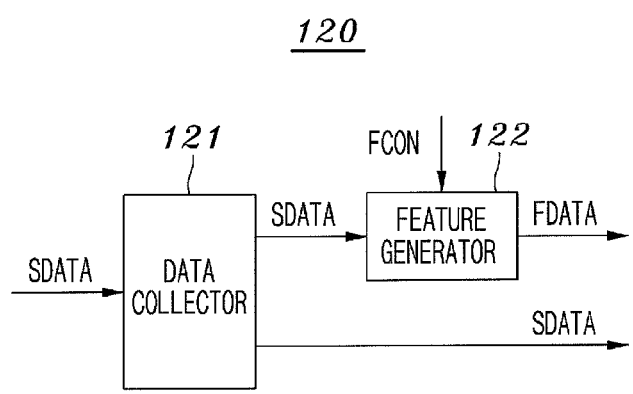
FIG. 3 is a block diagram showing a data processor included in the mobile middleware of FIG. 2.

FIG. 3 is a block diagram showing a data processor included in the mobile middleware of FIG. 2.

Referring to FIG. 3, the data processor 120 includes a data collector 121 and a feature generator 122.

The data collector 121 receives sensor data SDATA from the sensor 200 of FIG. 1, and provides the sensor data SDATA both to the feature generator 122 and the CMQ processor 130 of FIG. 2. The feature generator 122 extracts feature values FDATA from the sensor data SDATA as needed, and provides the feature values to the CMQ processor 130 of FIG. 2. The feature generator 122 starts or stops extracting the feature values FDATA from the sensor data SDATA in response to the feature control signal FCON received from the RSC manager 140 of FIG. 2. Since only the feature values FDATA required to determine whether CMQs are satisfied are generated, energy consumption caused by the extraction of the feature values FDATA can be reduced.

Figure 4:
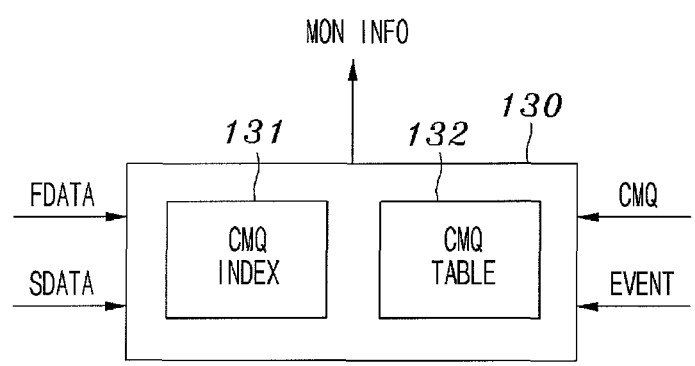
FIG. 4 is a block diagram showing a CMQ processor included in the mobile middleware of FIG. 2.

FIG. 4 is a block diagram showing a CMQ processor included in the mobile middleware of FIG. 2.

Referring to FIG. 4, the CMQ processor 130 includes a CMQ index 131 and a CMQ table 132.

The CMQ index 131 enables access to both an RS list, in which the values of context elements are stored while the IDs of context elements are used as keys, and related CMQs in order to rapidly search for CMQs that use the sensor data SDATA and/or the feature values FDATA received from the data processor 120 of FIG. 2. The CMQ index 131 may include RS lists, each including RS nodes, in which the possible values of the context elements are divided into region segments according to the ranges required by CMQs, and a source table including context elements and pointers for pointing at RS nodes, in which respective context elements are finally located.

The CMQ table 132 stores the IDs, results, and requirement conditions of CMQs in a hash structure. Since the CMQ table 132 uses a hash structure, it may have time complexity corresponding to a lookup time of O(1). The CMQ table 132 may include query IDs, which indicate the IDs of CMQs, query results, which indicate the results of CMQs corresponding to 'true' or 'false', and query elements, which indicate the IDs of context elements included in the conditions of CMQs, interval conditions used to indicate the ranges required by the context elements, and query results used to indicate whether the context elements satisfy the interval conditions.

When sensor data SDATA or a feature value FDATA is input to the CMQ processor 130, a context element, into which the current value is input, is found in the CMQ index 131. The value of the context element, stored in the RS list related to the context element before the value is input, is compared to the currently input context element value. When the value of the context element does not change, neither the CMQ index 131 nor the CMQ table 132 are updated. When the value of the context element changes, a pointer for pointing at a corresponding RS node is updated in the source table of the CMQ index 131, and the result of a query element is applied to the CMQ table 132 according to the changed context element value. When the results of a query indicating whether a CMQ is satisfied change due to the change in the result of the query element, the CMQ processor 130 transmits an event EVENT to the context-aware application program that requested the corresponding CMQ. Further, the changed monitoring context information MON INFO is transmitted to the RSC manager. Detailed procedures for the registration, deletion and processing of CMQs are described with reference to the examples of FIGS. 5 and 6.

Figure 5:
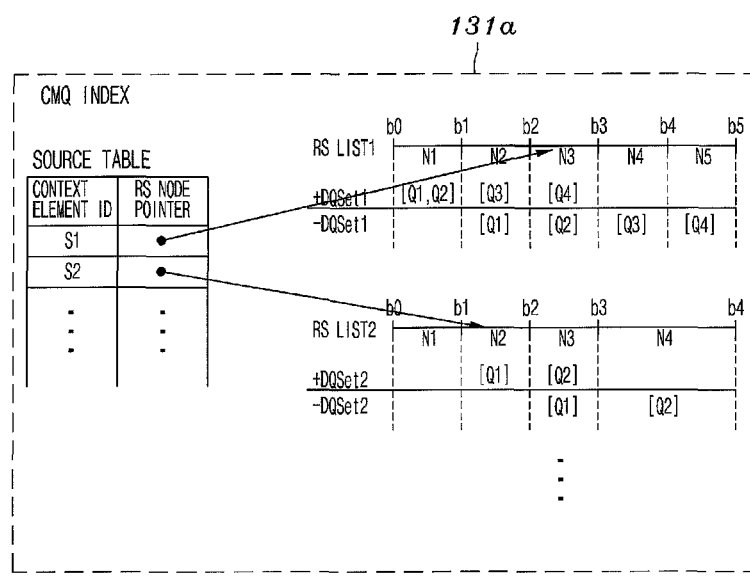

FIGS. 5 and 6 are diagrams respectively showing an example of a CMQ index 131a and an example of a CMQ table 132a included in the CMQ processor of FIG. 4.

Referring to FIGS. 5 and 6, the RS list of the CMQ index 131a includes RS nodes divided into region segments. The region segments of the RS list are divided by the upper limit or lower limit of the range of each context element required by a CMQ, that is, the interval condition of the context element. Each RS node includes '+DQSet', which is a set of CMQs in which the lower limit of the RS node is identical to the lower limit of the range of a relevant context element required by a relevant CMQ, and '−DQSet', which is set of CMQs in which the lower limit of the RS node is identical to the upper limit of the range of a relevant context element required by a relevant CMQ. That is, when an RS node changes to the subsequent RS node, adjacent thereto, as the value of a certain context element increases, the result of the corresponding context element of a CMQ included in the '+DQSet' becomes 'true', and the result of the corresponding context element of a CMQ included in the '−DQSet' becomes 'false'.

The procedure for registering a CMQ is described below. That is, a CMQ is stored in the CMQ table 132a. In this case, the results of the context elements included in the CONDITION clause of the CMQ are determined by the current values of the context elements that have just been updated. Further, the CMQ index 131a is updated. An RS node, in which the lower limit of the interval condition of each context element, included in the CONDITION clause of the CMQ, is included, is found. When the lower limit of the RS node and the lower limit of the interval condition of the context element are identical to each other, the CMQ is included in the '+DQSet' of the RS node. In contrast, when they are not identical to each other, the RS node is divided into two RS nodes in such a way that a right RS node (including a larger context element value) has a set of '+DQSet', having the CMQ as an element, and an empty set of '−DQSet', and a left RS node has '+DQSet' and '−DQSet' identical to those of the RS node before being divided. Further, an RS node, in which the upper limit of the interval condition of each context element included in the CONDITION clause of the CMQ is included, is found. When the lower limit of the RS node is identical to the upper limit of the interval condition of the context element, the CMQ is included in the '−DQSet' of the RS node. In contrast, when they are not identical to each other, the RS node is divided into two RS nodes in such a way that a right RS node (including a larger context element value) has a set of '−DQSet', having the CMQ as an element, and an empty set of '+DQSet', and a left RS node has '+DQSet' and '−DQSet' identical to those of the RS node before it is divided.

The procedure for deleting a registered CMQ is described below. A registered CMQ is deleted from the CMQ table 132, and the CMQ index 131a is updated. An RS node, which has a lower limit identical to the lower limit of the interval condition of each context element included in the CONDITION clause of the CMQ, is found, and the CMQ is deleted from the '+DQSet' of the RS node. An RS node, which has a lower limit identical to the upper limit of the interval condition of each context element, is found, and the CMQ is deleted from the '−DQSet' of the RS node. At this time, when both '+DQSet' and '−DQSet' become empty sets, the RS node is merged with an RS node in which the value of the context element, including the RS node, is less than the RS node, and which is adjacent to the RS node (hereinafter referred to as an 'adjacent left RS node').

The procedure for monitoring whether a registered CMQ is satisfied is described below. The CMQ processor 130 of FIG. 4 receives the sensor data SDATA and/or feature values FDATA. A context element, having a value given by the received sensor data SDATA and/or feature values FDATA, is found in the CMQ index 131a. The CMQs, in which the results of query elements change, are found in the RS list corresponding to the context element. The changed results of the query elements are applied to the CMQ table 132a. When the results of queries change due to the change in the results of the query elements, an event (EVENT) is generated, and changed monitoring context information MON INFO is transmitted to the RSC manager.

A method of searching for query elements, the results of which change, is described in detail. When the value of a context element is input, an RS node, including the input context element value, is found in the RS list corresponding to the context element. In this case, query elements, the results of which have changed, are found while linearly passing from the RS node having the immediately previous value of the context element to the RS node having the currently input value of the context element. Since the values of the context element, generated by sensors or the like, have locality, they are equal to or similar to immediately previous values thereof. Therefore, a linear search is efficient from the standpoint of time. The procedure for calculating query elements, the results of which change, is described in detail. When an RS node including the immediately previous value of a context element (hereinafter referred to as an 'immediately previous RS node') and an RS node including the currently input value of the context element (hereafter referred to as a 'current RS node') are identical to each other, there is no query element having changed results. When the immediately previous RS node is located to the left of the current RS node, the results of the query elements of CMQs, which are obtained by subtracting CMQs included in the '−DQSets' of the RS nodes ranging from a right RS node adjacent to the immediately previous RS node to the current RS node, from CMQs included in the '+DQSets' of the RS nodes, change from 'false' to 'true'. Further, the results of the query elements of CMQs, which are obtained by subtracting the CMQs included in the '+DQSets', from the CMQs included in the '−DQSets' change from 'true' to 'false'. Further, when the immediately previous RS node is located to the right of the current node, the results of the query elements of CMQs, which are obtained by subtracting CMQs, included in the '+DQSets' of the RS nodes ranging from the immediately previous RS node to a right RS node adjacent to the current RS node, from CMQs included in the '−DQSets' of the RS nodes, change from 'false' to 'true'. Further, the results of the query elements of CMQs, which are obtained by subtracting the CMQs included in the '−DQSets' from the CMQs included in the '+DQSets' change from 'true' to 'false'.

An example of a procedure for updating information about whether the registered CMQ is satisfied according to the embodiments of FIGS. 5 and 6 is described. The value of a context element 'S1' is currently included in the third RS node. In this case, when a change is performed so that the value of the context element 'S1' is included in the first RS node, the result of a query element corresponding to the context element, among the query elements of the CMQ having query IDs of 'Q1' and 'Q2', changes from 'false' to 'true'. Further, the result of the query element corresponding to the context element, among the query elements of the CMQ having query IDs of 'Q3' and 'IQ4', changes from 'true' to 'false'. At this time, as the query element '{S1, (b0, b1), false}' of 'Q1' changes to '{S1, (b0, b1), true}', the results of all of the query elements of 'Q1' become 'true', and thus the results of the query change from 'false' to 'true'. Therefore, an event (EVENT) is transmitted to the context-aware application program that requested the CMQ having a query ID of 'Q1'.

Figure 7:
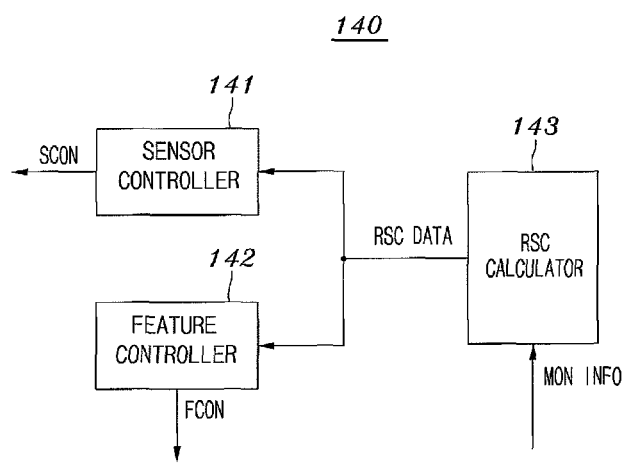
FIG. 7 is a block diagram showing an RSC manager included in the mobile middleware of FIG. 2.

FIG. 7 is a block diagram showing an RSC manager included in the mobile middleware of FIG. 2.

Referring to FIG. 7, the RSC manager 140 includes a sensor controller 141 and an RSC calculator 143. According to an embodiment, the RSC manager 140 may further include a feature controller 142.

The sensor controller 141 receives information about unnecessary sensor data RSC DATA from the RSC calculator 143, and applies a sensor control signal SCON to sensors so that the sensing and data transmission performed by the sensors, which provide unnecessary sensor data, are stopped. The sensor controller 141 stops the sensing and data transmission performed by the sensors that transmit data that is not required in order to determine whether a CMQ is satisfied, so that the energy consumption of the sensors or the data transfer rate of the sensors can be reduced, thus decreasing energy consumption caused by data transmission. Further, the sensor controller 141 can receive information about necessary sensor data RSC DATA, and can restart the stopped sensors by applying a sensor control signal SCON to the stopped sensors.

The feature controller 142 receives information about unnecessary feature values RSC DATA from the RSC calculator 143, and applies a feature control signal FCON to the feature generator so that a procedure for calculating the unnecessary feature values is eliminated. The feature controller 142 controls the feature generator so that the procedure for calculating feature values, which are not required in order to determine whether a CMQ is satisfied, is obviated, thus reducing energy consumption caused by the feature value calculation procedure. Further, the feature controller 142 receives information about necessary feature values RSC DATA, thus enabling the feature generator to extract feature values using the feature control signal FCON. According to an embodiment, the feature controller 142 may be obviated.

The RSC calculator 143 calculates an RSC required to determine whether a CMQ is satisfied on the basis of the monitoring context information MON INFO, which indicates the current context monitoring results and information about CMQs. The procedure for calculating the RSC is described below. A 'true' context element set, which is a set of all 'true' context elements included in CMQs having a result of 'true', and a 'false' context element set, which is a set of all 'false' context elements included in CMQs having a result of 'false', are obtained. Among the subsets of the 'false' context element set, a minimum 'false' context element set (RSC), for which each CMQ having a result of 'false' includes one or more 'false' context elements and in which the number of 'false' context elements' is a minimum, is obtained. The minimum 'false' context element set (RSC) may be an approximate minimum 'false' context element set approximately obtained using a greedy heuristic method. In the union of the 'true' context element set and the minimum 'false' context element set, when the results of CMQs, the results of which become 'false' due to the first context element included in the minimum 'false' context element set, can be determined to be 'false' due to the second context element included in the 'true' context element set, an RSC is calculated without considering the first context element. When the greedy heuristic algorithm is used, the complexity of the calculation of the RSC calculator 143 can be reduced.

Meanwhile, the RSC includes all context elements that cause the results of the CMQs having results of 'true', to change to 'false', but may include only some context elements for CMQs having results of 'false'. Therefore, when all context elements, which are included in the RSC and are currently being monitored, in the CMQ having a result of 'false', become 'true', sensors and/or feature generators related to context elements, which are not monitored, are operated. According to the data of the operated sensors and/or feature generators, the result of the CMQ is updated. After updating, the RSC calculator 143 obtains an RSC again, and controls sensors and/or feature generators according to the changed RSC. Through this procedure, efficient context monitoring can be performed while minimizing energy consumption.

A detailed example of the calculation of RSC will be described with reference to FIGS. 8, 9, 10, and 11.

FIGS. 8, 9, 10, and 11 are diagrams showing an example of the obtainment of an RSC using the condition of a CMQ and the values of context elements.

With reference to FIGS. 8, 9, 10, and 11, an example of the calculation of an RSC is described. In FIG. 8, 10 CMQs, having query IDs ranging from 'A' to 'J', and the conditions of respective CMQs, are indicated. In this case, the context elements included in the CMQs include 7 elements, that is, 'S10', 'S11', 'S12', 'S13', 'S14', 'S15', and 'S16'. In this example, it is assumed that the value of 'S10' is 19, the value of 'S11' is 27, the value of 'S12' is 6, the value of 'S13' is 58, the value of 'S14' is 2, the value of 'S15' is 72, and the value of 'S16' is 38. On the basis of the assumed values, the results of context elements indicated by dotted rectangles in FIG. 8 become 'false'.

Figure 9:
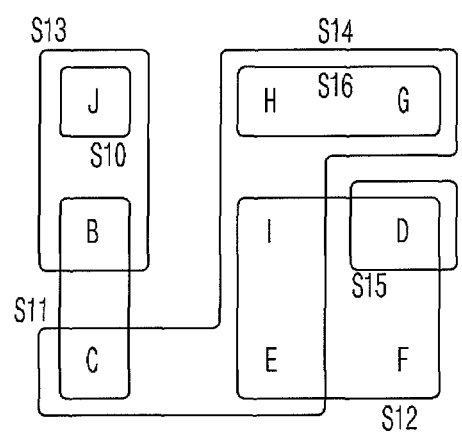

FIG. 9 illustrates a 'true' context element set and a 'false' context element set. Among 10 CMQs, only 'A', not including 'false' context elements, currently has a result of 'true', and thus only context elements 'S10' and 'S11' related to the conditions of 'A' are included in the 'true' context element set. Meanwhile, it can be seen that, among the context elements belonging to the 'false' context element set, CMQs, the results of which become 'false' due to the context element 'S12' are 'D', 'E', 'F', and 'I', and CMQs, the results of which become 'false' due to the context element 'S13', are 'B' and 'J.

Figure 10:
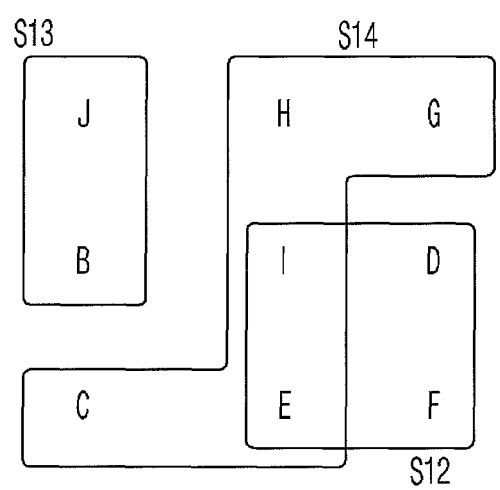
Figure 11:
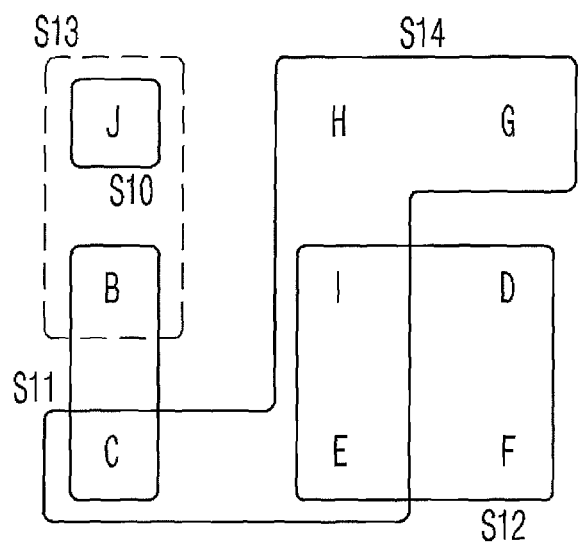

FIG. 10 illustrates a minimum 'false' context element set. It can be seen that, as long as the results of three context elements 'S12', 'S13', and 'S14' are 'false', the results of all of the CMQs 'B' to 'J' are 'false'. That is, among the subsets of the 'false' context element set, for which each of the CMQs 'B' to 'J' having results of 'false' includes one or more 'false' context elements, a subset in which the number of 'false' context elements is a minimum is the minimum 'false' context element set '{'S12', 'S13', 'S14'}'. Further, this can be approximately obtained using a greedy heuristic method. FIG. 11 illustrates an RSC. In the union of the 'true' context element set and the minimum 'false' context element set, that is, '{S10, S11, S12, S13, S14}', the CMQ 'B', which is known to be 'false' due to the context element 'S13', can be known to be 'false' due to the context element 'S11' of the 'true' context element set', and the CMQ 'J' can be determined to be false due to the context element 'S10'. As a result, the content element 'S13' is excluded from the minimum 'false' context element set. Therefore, the ultimate minimum 'false' context element set (RSC) becomes '{S10, S11, S12, S14}'. Consequently, only sensors for generating data about the context elements 'S10, S11, S12, and S14' need be operated.

Meanwhile, the form of a CMQ, the data structure of a CMQ processor, the existence of a context broker, the existence of a data processor, etc., can be suitably changed according to the characteristics of the device desired to be implemented.

As described above, the mobile middleware, the context monitoring method, the context-aware system, and the context-aware service provision method according to embodiments of the present invention can perform energy-efficient context monitoring, and are especially suitable for mobile devices having limited energy.

Further, the mobile middleware, the context monitoring query processing method, the context-aware system, and the context-aware service provision method according to embodiments of the present invention can promptly process context information, thus performing real-time context monitoring.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:
1. Mobile middleware, comprising:
a Context Monitoring Query (CMQ) processor configured to store requested CMQs received from context-aware application programs, and configured to receive sensor data from at least one sensor, and configured to monitor whether the stored CMQs are satisfied with reference to the received sensor data, and configured to transmit an event to the context-aware application programs according to results of the monitoring;
a Reduced Source Cover (RSC) manager configured to control activation of the at least one sensor so that only sensor data required to be used to determine whether the requested CMQ is satisfied is generated and transmitted to the Context Monitoring Query (CMQ) processor so as to reduce energy consumption during the performance of the monitoring a data processor configured to receive the sensor data from the sensors and to transmit the sensor data to the CMQ processor.

2. The mobile middleware according to claim 1, wherein the mobile middleware is used in a Personal Area Network (PAN) environment.

3. The mobile middleware according to claim 1, wherein each of the CMQs comprises:
a NOTIFY clause for specifying Identifications (IDs) of context-aware application programs that requested respective CMQs;
a CONDITION clause for specifying at least one condition, including any one of the context elements, an operator, and a condition value, in a conjunctive normal form; and
a DURATION clause for specifying a time for which the monitoring is maintained.

4. The mobile middleware according to claim 1, wherein the CMQ processor comprises:
a CMQ table for storing query IDs, which are required to identify the CMQs, query results, which indicate results of the CMQs, and query elements, which indicate conditions included in the CMQs; and
a CMQ index for storing IDs of the context elements and current values of the context elements.

5. The mobile middleware according to claim 4, wherein each of the query elements comprises IDs of respective context elements, interval conditions, indicating ranges required by the context elements, and element results, indicating whether respective context elements satisfy the interval conditions.

6. The mobile middleware according to claim 4, wherein the CMQ index comprises:
an RS list including Region Segment (RS) nodes, generated by dividing possible values of the context elements, into region segments according to the ranges required by the CMQs; and
a source table having IDs of respective context elements, and pointers for pointing at RS nodes, including current values of the context elements.

7. The mobile middleware according to claim 1, wherein the RSC manager comprises:
- an RSC calculator for calculating the RSC required to determine whether the CMQs are satisfied with reference to the results of the monitoring; and
- a sensor controller for stopping sensing and data transmission performed by sensors, which provide data about context elements that do not belong to the RSC, or for reducing a data transfer rate of the sensors.

8. The mobile middleware according to claim 7, wherein the RSC calculator obtains a 'true' context element set, which is a set of all 'true' context elements, included in CMQs having results of 'true', among the CMQs, obtains a 'false' context element set, which is a set of all 'false' context elements, included in CMQs having results of 'false', among the CMQs, obtains a minimum 'false' context element set, for which each CMQ having a result of 'false' includes one or more 'false' context elements and in which a number of 'false' context elements' is a minimum, among subsets of the 'false' context element set, obtains a union of the 'true' context element set and the minimum 'false' context element set, and calculates the RSC without considering a first context element, when any one of CMQs, results of which become 'false' due to the first context element included in the minimum 'false' context element set in the union of the sets, can be determined to be 'false' due to a second context element included in the 'true' context element set.

9. The mobile middleware according to claim 8, wherein the minimum 'false' context element set is an approximate minimum 'false' context element set obtained using a greedy heuristic method.

10. The mobile middleware according to claim 1, wherein the data processor comprises:
- a data collector for receiving the sensor data from the sensors and outputting the sensor data; and
- a feature generator for receiving the sensor data from the data collector, extracting feature values from the sensor data, and outputting the feature values.

11. The mobile middleware according to claim 10, wherein the RSC manager comprises:
- an RSC calculator for calculating the RSC, required to determine whether the CMQs are satisfied, with reference to the results of the monitoring;
- a sensor controller for stopping sensing and data transmission performed by sensors, which provide data about context elements that do not belong to the RSC, or for reducing a data transfer rate of the sensors; and
- a feature controller for controlling the feature generator so that a procedure for calculating feature values corresponding to context elements that do not belong to the RSC is obviated, thus reducing energy consumption caused by the procedure for calculating the feature values.

12. The mobile middleware according to claim 1, further comprising a context broker for converting the requested CMQs into system-level CMQs and outputting the system-level CMQs to the CMQ processor.

13. A context monitoring method implemented by a Mobile middleware, the method comprising:
- registering a requested Context Monitoring Query (CMQ) received from context-aware application programs;
- store the requested CMQs;
- receiving sensor data from sensors and monitoring whether the registered CMQ is satisfied with reference to the received sensor data;
- controlling activation of the sensors so that only sensor data required to be used to determine whether the requested CMQ is satisfied is generated and transmitted to the Context Monitoring Query (CMQ) processor so as to reduce energy consumption during the performance of the monitoring; and
- providing an event to the context-aware application according to the results of the monitoring,
- wherein the receiving sensor data comprises: receiving the sensor data from the sensors; and extracting feature values from the received sensor data.

14. The context monitoring method according to claim 13, wherein the context monitoring method is used in a PAN environment.

15. The context monitoring method according to claim 13, wherein the registering the CMQ comprises:
- converting the requested CMQ into a system-level CMQ; and
- storing the system-level CMQ.

16. The context monitoring method according to claim 13, wherein the controlling the activation of the sensors comprises:
- calculating the RSC, required to determine whether the registered CMQ is satisfied, with reference to the results of the monitoring; and
- stopping sensing and data transmission performed by sensors, which provide data about context elements that do not belong to the RSC.

17. The context monitoring method according to claim 13, wherein:
- the monitoring whether the registered CMQ is satisfied is performed to receive the sensor data and feature value, extracted from the sensor data, and to thus monitor whether the registered CMQ is satisfied; and
- the controlling the activation of the sensors is performed to control activation of the sensors and generation of the feature values so that, of the received sensor data and the received feature values, data about only context elements belonging to the RSC required to determine whether the CMQ is satisfied, is generated.

18. The context monitoring method according to claim 13 further comprising,
- deleting the registered CMQ when a duration of the registered CMQ has elapsed, after the providing,
- wherein the registering comprises: registering a Context Monitoring Query (CMQ) requested from at least one context-aware application program,
- wherein the providing comprising:
- providing an event to the at least one context-aware application program according to results of the monitoring.

19. A context-aware service system, comprising:
- at least one sensor configured to sense user context information and to generate sensor data; and
- a mobile middleware, comprising:
  - a Context Monitoring Query (CMQ) processor configured to store requested CMQs received from context-aware application programs, and configured to receive sensor data from at least one sensor, and configured to monitor whether the stored CMQs are satisfied with reference to the received sensor data, and configured to transmit an event to the context-aware application programs according to results of the monitoring; and
  - a Reduced Source Cover (RSC) manager configured to control activation of the at least one sensor so that only sensor data required to be used to determine whether the requested CMQ is satisfied is generated and transmitted to the Context Monitoring Query (CMQ) processor so as to reduce energy consumption during the performance of the monitoring a data processor configured to receive the sensor data from the sensors and transmit the sensor data to the CMQ processor.

\* \* \* \* \*